United States Patent
Horner et al.

(10) Patent No.: US 7,571,742 B2
(45) Date of Patent: Aug. 11, 2009

(54) BUTTERFLY OUTFLOW VALVE

(75) Inventors: Darrell W. Horner, Oro Valley, AZ (US); Simon L. Waddell, Oro Valley, AZ (US); Christopher L. Thomas, Tucson, AZ (US); Steven D. Carter, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 168 days.

(21) Appl. No.: 11/088,386

(22) Filed: Mar. 23, 2005

(65) Prior Publication Data

US 2006/0214128 A1    Sep. 28, 2006

(51) Int. Cl.
*F16K 1/22* (2006.01)
*F16L 7/00* (2006.01)

(52) U.S. Cl. .................. 137/375; 123/337; 251/305
(58) Field of Classification Search ......... 251/304–308; 123/337; 137/375
See application file for complete search history.

(56) References Cited

U.S. PATENT DOCUMENTS

| | | | |
|---|---|---|---|
| 2,815,705 A | 12/1957 | Jensen | |
| 2,830,521 A | 4/1958 | Fischer et al. | |
| 2,846,934 A | 8/1958 | Mauldin | |
| 2,882,010 A * | 4/1959 | Bryant | 251/306 |
| 3,080,145 A * | 3/1963 | Swain | 251/306 |
| 3,260,502 A | 7/1966 | Plumer | |
| 3,282,555 A * | 11/1966 | Mallonee, II et al. | 251/84 |
| 3,344,808 A | 10/1967 | Cary | |
| 3,384,340 A * | 5/1968 | Fawkes | 251/307 |
| 3,727,837 A | 4/1973 | Gazzera et al. | |
| 3,749,359 A * | 7/1973 | Montesi | 251/306 |
| 3,905,577 A * | 9/1975 | Karpenko | 251/357 |
| 3,915,587 A | 10/1975 | Rannenberg | |
| 4,290,615 A * | 9/1981 | Etcheverry | 251/307 |
| 4,301,831 A | 11/1981 | Lord | |
| 4,324,383 A * | 4/1982 | Ferro | 251/308 |
| 4,327,765 A * | 5/1982 | Wilson et al. | 137/312 |
| 4,469,305 A | 9/1984 | Baumann | |
| 4,489,917 A | 12/1984 | Baumann | |
| 4,516,597 A * | 5/1985 | Ueda | 137/314 |
| 4,632,360 A | 12/1986 | DeSalve | |
| 4,899,984 A | 2/1990 | Strickler et al. | |
| 5,067,506 A | 11/1991 | Ball et al. | |
| 5,076,308 A | 12/1991 | Cohen | |
| 5,203,539 A * | 4/1993 | Stary | 251/308 |

(Continued)

FOREIGN PATENT DOCUMENTS

DE    10359609 A1    7/2005

(Continued)

*Primary Examiner*—John Rivell
*Assistant Examiner*—Andrew J Rost
(74) *Attorney, Agent, or Firm*—Oral Caglar, Esq.

(57) ABSTRACT

An outflow valve is disclosed for use in a pressure vessel. The outflow valve includes a dual wall valve housing having a central bore, a butterfly plate assembly and an angled drive shaft. The butterfly plate assembly is designed to fit and rotate within the central bore. The angled drive shaft has first and second ends rotateably coupled to the dual wall valve housing, and the angled drive shaft is attached to the butterfly plate. The drive shaft is designed to rotate the butterfly plate assembly between a closed position and an open position within the central bore.

17 Claims, 4 Drawing Sheets

U.S. PATENT DOCUMENTS

| | | |
|---|---|---|
| 5,238,220 A | 8/1993 | Shell et al. |
| 5,275,200 A * | 1/1994 | Yamamoto ................. 137/377 |
| 5,351,708 A | 10/1994 | Donato et al. |
| 5,465,756 A | 11/1995 | Royalty et al. |
| 5,640,942 A * | 6/1997 | Hollister ..................... 123/337 |
| 5,664,760 A | 9/1997 | Army et al. |
| 6,142,173 A * | 11/2000 | Bekeredjian et al. ........ 137/375 |
| 6,283,677 B1 * | 9/2001 | Slattery et al. .............. 405/215 |
| 6,505,643 B2 * | 1/2003 | Scholten et al. ............. 137/554 |
| 6,761,348 B2 * | 7/2004 | Michels et al. .............. 251/305 |
| 6,918,374 B1 * | 7/2005 | Kurita et al. ................. 123/396 |
| 6,923,157 B2 * | 8/2005 | Torii et al. ................... 123/337 |
| 2002/0189584 A1 * | 12/2002 | Tanaka et al. ................ 123/399 |
| 2003/0030022 A1 * | 2/2003 | Michels et al. .............. 251/305 |
| 2003/0047703 A1 | 3/2003 | Patterson |
| 2003/0145603 A1 | 8/2003 | Reed et al. |

FOREIGN PATENT DOCUMENTS

| | | |
|---|---|---|
| EP | 1126145 | 8/2001 |
| EP | 1362692 | 11/2003 |
| EP | 06 251495 | 8/2006 |
| GB | 732184 | 4/1954 |
| GB | 781183 | 7/1955 |
| GB | 909420 | 2/1959 |

* cited by examiner

BUTTERFLY OUTFLOW VALVE

TECHNICAL FIELD

The present invention relates generally to outflow valves, and more particularly to butterfly outflow valves.

BACKGROUND

Generally, high altitude aircraft have a Cabin Pressure Control System (CPCS) to manage the pressure of the aircraft cabin, which is an enclosed space within the fuselage of the aircraft that may contain the crew, passengers, and/or cargo. The CPCS exhausts air from the aircraft cabin in a controlled manner and typically uses an outflow valve. One type of outflow valve that is used in a CPCS is a butterfly outflow valve.

The butterfly outflow valve contains a butterfly plate or disk that rotates on a drive shaft in the bore of a valve housing. Numerous advancements and improvements have been made in butterfly outflow valves, including numerous advancements and improvements in the butterfly plate. However, additional advancements and improvements are continually sought.

Accordingly, it is desirable to provide advancements and improvements in outflow valves. In addition, it is desirable to provide advancements and improvements in butterfly outflow valves. Furthermore, it is desirable to provide advancements and improvements in butterfly outflow valves used in a CPCS. Moreover, other desirable features and characteristics of the present invention will become apparent from the subsequent detailed description and the appended claims, taken in conjunction with the accompanying drawings and the foregoing technical field and background

BRIEF SUMMARY

An outflow valve is provided in accordance with one exemplary embodiment of the present invention. The outflow valve comprises a dual wall valve housing having a central bore and a butterfly plate assembly configured to rotate within the central bore. The outflow valve further comprises an angled drive shaft fixedly coupled to the butterfly plate assembly with multiple fasteners. The angled drive shaft comprises first and second ends rotateably coupled to the dual wall valve housing. The angled drive shaft is configured to rotate the butterfly plate assembly between a closed position and an open position.

An outflow valve is also provided in accordance with another exemplary embodiment of the present invention. The outflow valve comprises a cylindrical valve housing, which includes an inner sleeve and an outer housing, and an angled drive shaft having first and second ends rotateably coupled to the cylindrical valve housing. The outflow valve also comprises a butterfly plate dimensioned to fit within the cylindrical valve housing and the butterfly plate is fixedly coupled to the angled drive shaft and configured to rotate with the angled drive shaft between a closed position and an open position. The outflow valve further comprises a wiper seal mounted around a perimeter of the butterfly plate and configured to sealingly engage the inner sleeve in the closed position.

BRIEF DESCRIPTION OF THE DRAWINGS

The following drawings are illustrative of the particular embodiments of the invention and therefore do not limit its scope. They are presented to assist in providing a proper understanding of the invention. The drawings are not to scale and are intended for use in conjunction with the explanations in the following detailed descriptions. The present invention will hereinafter be described in conjunction with the appended drawings, wherein like reference numerals denote like elements, and.

DETAILED DESCRIPTION OF A PREFERRED EMBODIMENT

Figure 2:
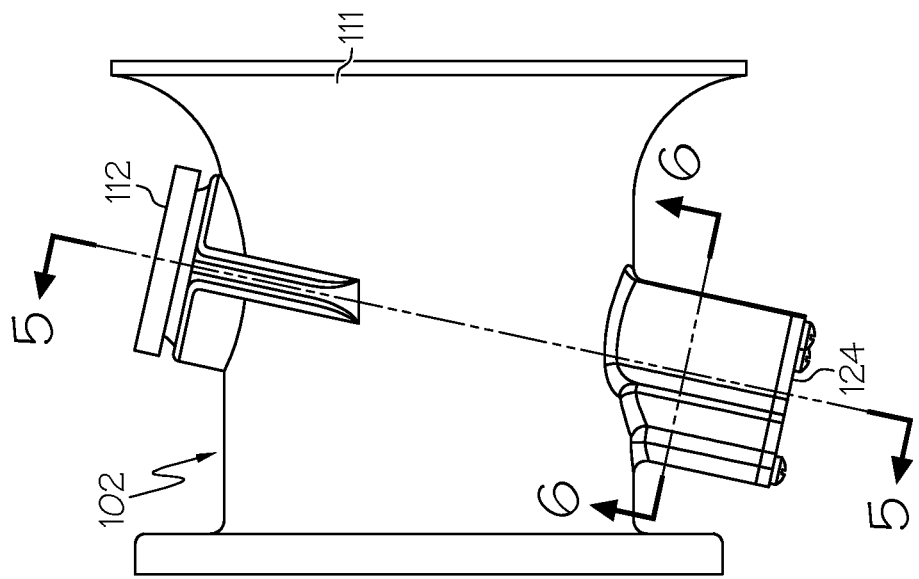
FIG. 2 is a side view of the outflow valve of FIG. 1
Figure 1:
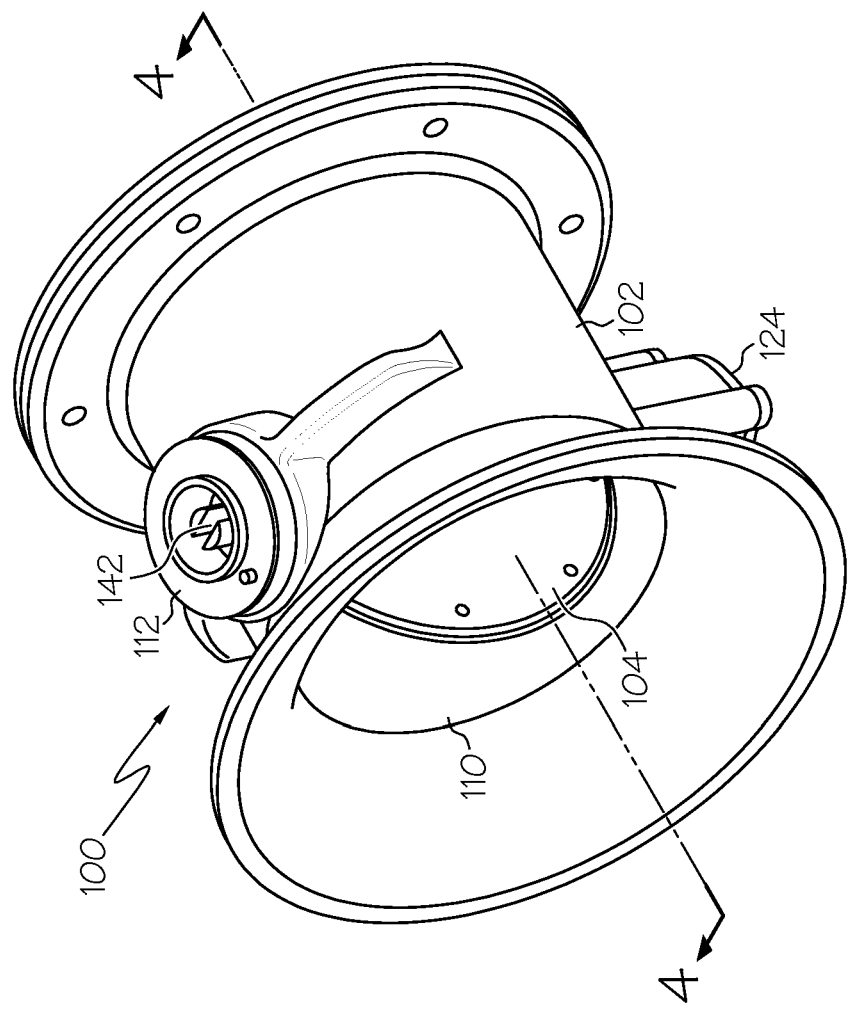
FIG. 1 is a perspective view showing one embodiment of an outflow valve.
Figure 3:
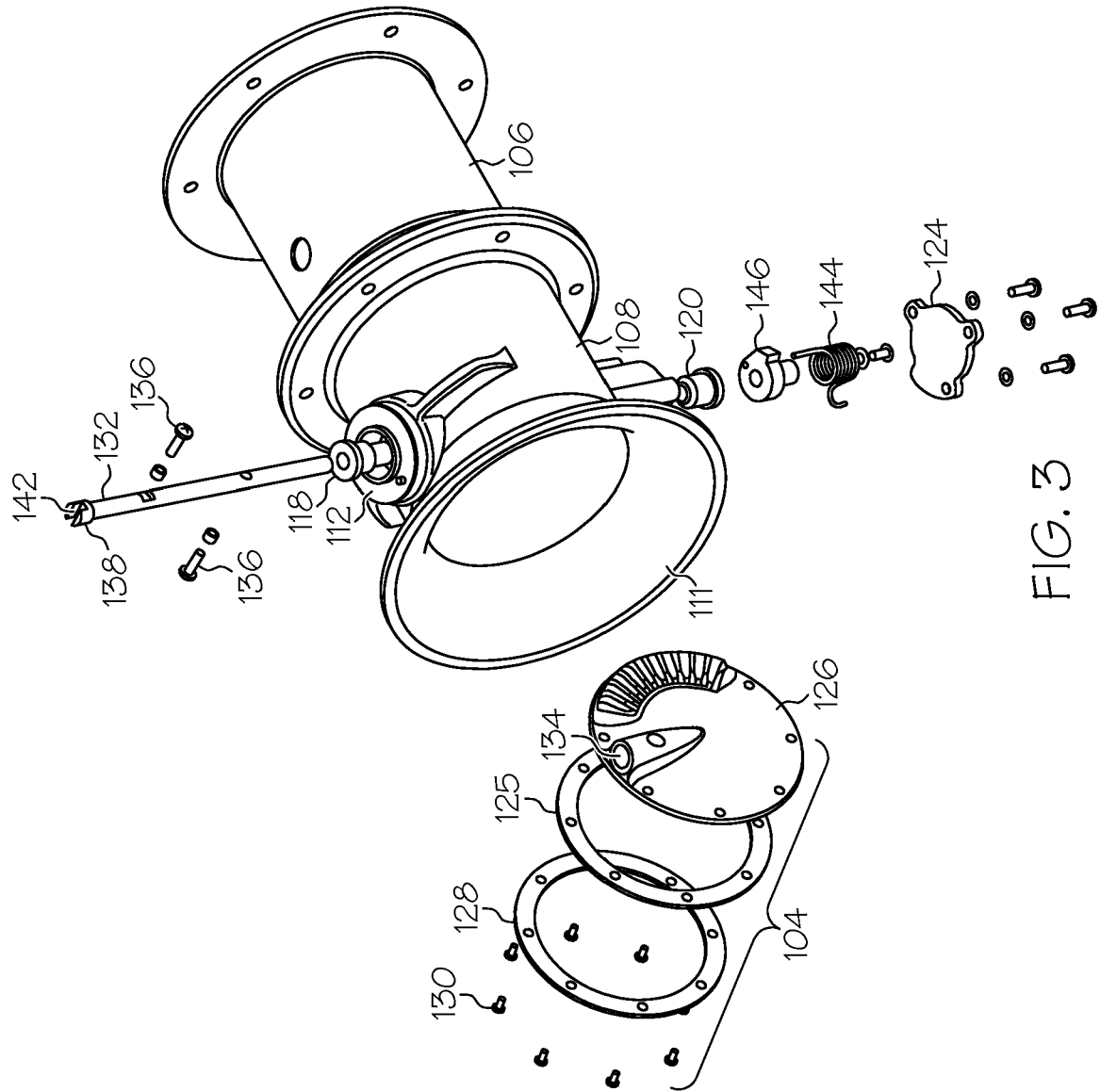
FIG. 3 is an exploded perspective view of the outflow valve of FIG. 1.

The following detailed description of the invention is merely exemplary in nature and is not intended to limit the invention or the application and uses of the invention. Furthermore, there is no intention to be bound by any theory presented in the preceding background of the invention or the following detailed description of the invention.

Referring to FIGS. 1-5, an outflow valve 100 is illustrated in accordance with an exemplary embodiment of the present invention. The outflow valve 100 includes a dual wall valve housing 102. The outflow valve 100 also includes first and second drive shaft reinforcing sleeves 118, 120, a butterfly plate assembly 104 with a reinforcing ring 128, multiple fasteners 130 to fasten the reinforcing ring 128 to the plate assembly 104, multiple fasteners 136 to fasten the butterfly plate assembly 104 to a drive shaft 132, a valve end-of-travel stop 122, and a valve closing spring 144.

Figure 4:
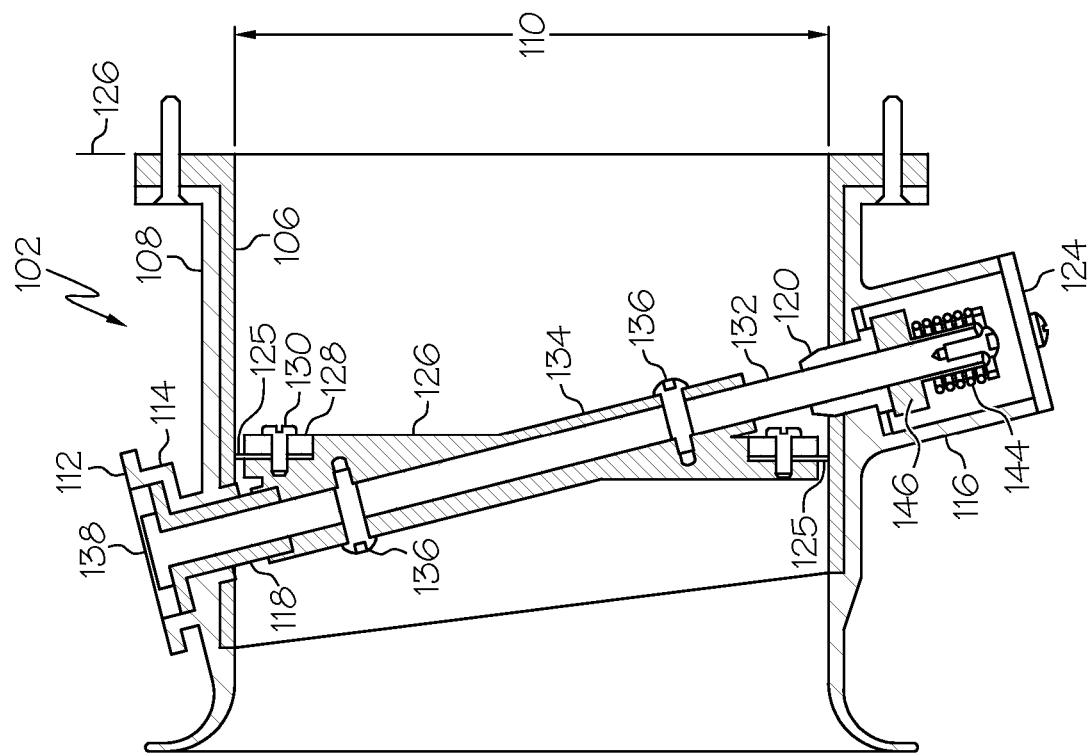
FIG. 4 is a cross-sectional view taken along line 4-4 of FIG. 1 showing the outflow valve in a closed position.

The valve housing 102 includes a central bore with a dual wall formed of an inner sleeve 106 and an outer housing 108. The inner sleeve 106 may be made of any number of materials, but is preferably made of a high strength material, and preferably designed to handle the normal pressure load and valve mounting loads. For example, the inner sleeve 106 may be made of a metal (e.g., aluminum) or a composite material (e.g., fiber reinforced PolyEtherlmide (PEI), fiber reinforced Polyetheretherketone (PEEK)). The inner diameter 110 of the inner sleeve 106 is a machined surface with tolerances and finishes to aid in valve wiper sealing (discussed further below). The length of the inner sleeve 106 may be limited to a length that supports the outer housing 108 around the drive shaft 132 and pressure vessel or the length of the inner sleeve 106 may be different on each side due to the angle of the drive shaft 132. As shown in FIG. 4, inner sleeve 106 is longer at the top portion than the bottom portion. However, the inner sleeve 106 may be of a substantially constant length.

The outer housing 108 may be a molded plastic/composite material that is a high-strength material suitable for the environment of the valve (e.g., chemical, temperature, strength, durability, etc.). In one exemplary embodiment, the outer housing 108 may be formed from a composite material, such as a fiber reinforced PolyEtherlmide (PEI), fiber reinforced Polyetheretherketone (PEEK), or any other suitable composite material. The outer housing 108 is preferably a molded part with geometric features that provide a bell-shaped inlet 111 that is configured to increase air speed and reduce the total pressure drop. The geometric features of the outer housing 108 have enveloping dimensions for reinforcing the inner sleeve 106 and that provide an actuator mounting interface 112, upper and lower housing bosses 114, 116 that support the upper/lower drive shaft reinforcing sleeves 118, 120, a valve rotational stop 122 (see FIG. 6), and a lower shaft spring cover 124.

The outer housing 108 can be either molded over the inner sleeve 106, such as during an injection molding process, or it can be bonded to the inner sleeve 106 using a suitable adhesive. It should be understood that if the two are bonded, the bonding preferably does not fuse the inner sleeve 106 and outer housing 108 or form a single walled element. Rather, the bonding maintains the dual wall formed of the outer housing 108 and the inner sleeve 106, and this dual wall provides numerous advantages and improvements such as redundancy.

The butterfly plate assembly 104 includes a wiper seal 125, a molded butterfly plate 126, and the previously mentioned reinforcing ring 128 that, as was also previously mentioned, are held together with multiple fasteners 130. The reinforcing ring 128 may be formed from steel, aluminum or other material or composite. The butterfly plate assembly 104 is fixed to an angled drive shaft 132 within the valve housing 102. The butterfly plate 126 may be manufactured out of a suitable plastic/composite material or metal that is molded to the geometry of the outer housing 108. For example, the butterfly plate 126 may be manufactured out of fiber reinforced Poly-Etherlmide (PEI), fiber reinforced Polyetheretherketone (PEEK), or aluminum. Preferable geometric interface features of the butterfly plate 126 are: aerodynamic shape, a mounting interface for the plate reinforcing ring/seal retaining ring 128, drive shaft mounting and fixing hardware, and reinforcement angled drive shaft sleeve 134 for the drive shaft 132.

The reinforcing ring 128 may be manufactured from steel or other suitable material and is affixed to the butterfly plate 126 with multiple fasteners 130. In this exemplary embodiment, the wiper seal 125 is a flat annular ring made of, for example, dacron reinforced silicon material. However, the wiper seal 125 can be made of any other suitable material or have any other suitable shape.

The drive shaft 132 extends through the butterfly plate 126 and is mounted thereto using at least two fasteners 136. The butterfly plate 126 could also employ an internal serration, or other means, to mate with the drive shaft 132 and prevent non-driven butterfly plate rotation. In the depicted embodiment, the drive shaft 132 is shown as a single shaft. It will be appreciated, however, that the drive shaft 132 may also be made of two shafts, an upper drive shaft and lower drive shaft. If the draft shaft 132 is made of an upper drive shaft and a lower drive shaft, then the upper shaft is preferably fixed by at least two fasteners or a spline. In either case, the drive shaft 132 preferably mates with an actuator (not shown) on a first end 138 (e.g., upper end) and performs valve stop and closing torque functions on a second end 140 (e.g., lower end). The upper and lower end designations have no purpose except for ease of description and the upper and lower designations could be swapped with no adverse affect on the assembly and functionality. Further, two drive shafts could be employed with slightly different installation design, but similar functions as the single shaft.

The drive shaft 132 has an interface 142, such as a slot, on the first end 138 that can be driven by a pneumatic, electromechanical, or other type of actuator (not shown). The drive shaft 132 is installed into the butterfly plate 126 and is supported by drive shaft reinforcing sleeves 118, 120 at both the upper and lower housing bosses 114, 116. The drive shaft reinforcing sleeves 118, 120 may act both as a bearing and a reinforcing section for the drive shaft 132. The drive shaft reinforcing sleeve 118 extends through the shaft boss 114 of the valve housing 102 into the butterfly plate 126. The lower sleeve 120 extends from the valve housing 102 in order to provide a protrusion that inhibits a fully open butterfly plate 126.

If the drive shaft reinforcing sleeve 118, 120 is used as a bearing, then the drive shaft reinforcing sleeve 118, 120 preferably has the appropriate friction and wear properties. If the reinforcing sleeve 118, 120 is not used as a bearing, then it can be press fit onto the shaft 132 in any number of configurations. Alternatively, the reinforcing sleeve 118, 120 can be tolerance fit over the shaft (i.e., fixed into the valve housing) and a suitable ball bearing may be used in the upper and lower valve shaft bosses 114, 116.

Figure 6:
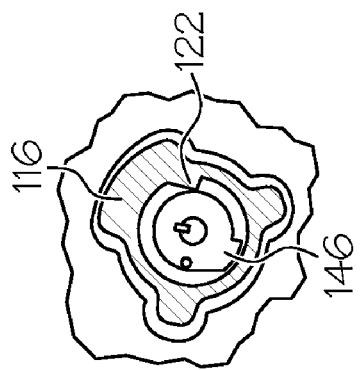
FIG. 6 is a cross-sectional view taken along line 6-6 of FIG. 2 showing a valve end-of-travel stop.
Figure 5:
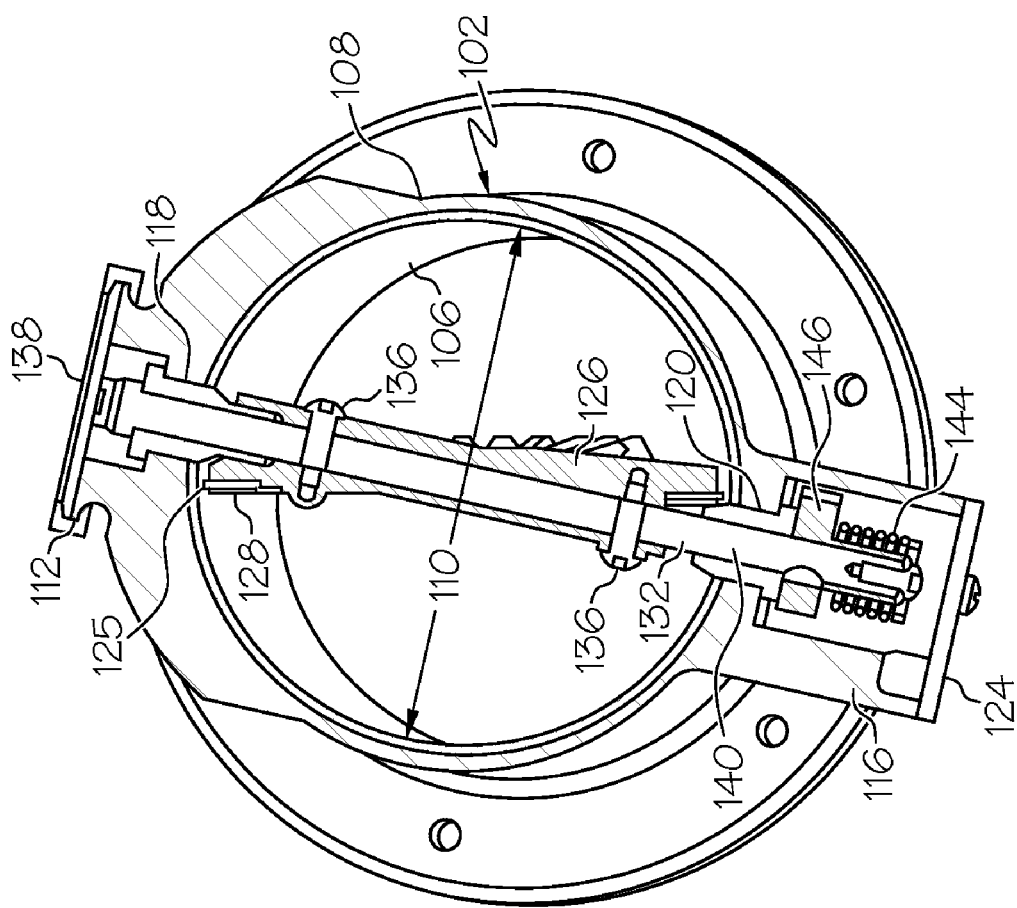
FIG. 5 is a cross-sectional view taken along line 5-5 of FIG. 2 showing the outflow valve in an open position.

The lower valve shaft boss 116 employs a valve end-of-travel stop 122 that interacts with the shaft stop 146 as shown in FIG. 6. The end-of-travel stop 122 is employed on the lower shaft end 140 opposite the actuated upper shaft end 138 to prevent full rotation of the shaft 132. The end-of-travel stop 122 contacts the shaft stop 146 and limits the valve stroke to approximately the full-closed position.

A valve closing torsion spring 144 is mounted on the lower shaft 140 opposite the actuated upper shaft end 138. The spring 144 engages a shaft boss 146 relative to the valve spring cover 124 to close the valve 104. In the event that there is a separation of the valve butterfly plate 126 or drive shaft 132 from the rotary actuator, the valve closing spring 144 closes the valve assembly 102. The valve closing torsion sprng 144 can be any number of spring such as a leaf spring, a lever spring, or a compression spring.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An outflow valve for controlling pressure in an aircraft cabin, the outflow valve comprising:
   a redundant dual wall valve housing having a central bore, comprising:
      an outer housing designed to independently withstand a pressure differential between aircraft cabin pressure and atmospheric pressure outside the aircraft cabin and valve mounting loads of said outflow valve when in use; and
      an inner sleeve designed to independently withstand the pressure differential and valve mounting loads of said outflow valve when in use disposed within the outer housing, the inner sleeve including first and second apertures therethrough;
      the outer housing being molded onto the inner sleeve with the inner sleeve not being fused to the outer housing so that the inner sleeve and the outer housing provide redundant protection against pressure and mounting load failure;
   a butterfly plate assembly rotationally disposed within the central bore;
   wherein the butterfly plate has at least one planar surface;

wherein the butterfly plate is oriented with the at least one planar surface orthogonal to the central bore when the butterfly plate is in a closed position;
an angled drive shaft coupled to the butterfly plate assembly with a plurality of fasteners, the angled drive shaft comprising first and second ends rotationally coupled to the dual wall valve housing and configured to rotate the butterfly plate assembly between the closed position and an open position;
wherein an axis of the angled drive shaft is oriented non-parallel to the planar surface of the butterfly plate;
a first drive shaft reinforcing sleeve mounted around the first end of the angled drive shaft extending through the first aperture and into the central bore; and
a second drive shaft reinforcing sleeve mounted around the second end of the angled drive shaft, the second drive shaft reinforcing sleeve extending through the second aperture and into the central bore to form a protrusion that is spaced from the butterfly plate assembly in the closed position and that abuts the butterfly plate assembly in the open position to limit the movement thereof.

2. The outflow valve of claim 1, further comprising a closing spring coupled to the second end of the drive shaft and configured to urge the butterfly plate assembly toward the closed position.

3. The outflow valve of claim 1, the butterfly plate assembly comprising:
a butterfly plate having a cavity therein that receives the first drive shaft reinforcing sleeve;
a wiper seal mounted around a perimeter of the butterfly plate; and
a butterfly plate reinforcing ring coupled to the wiper seal and butterfly plate with a second plurality of fasteners.

4. The outflow valve of claim 3, wherein the butterfly plate is at least partially formed from fiber reinforced Polyetheretherketone (PEEK).

5. The outflow valve of claim 3, wherein the butterfly plate is at least partially formed from fiber reinforced PolyEtherlmide (PEI).

6. The outflow valve of claim 1, wherein the inner sleeve is at least partially formed from aluminum.

7. The outflow valve of claim 1, wherein the inner sleeve is at least partially formed from fiber reinforced Polyetheretherketone (PEEK).

8. The outflow valve of claim 1, wherein the inner sleeve is at least partially formed from fiber reinforced PolyEtherlmide (PEI).

9. The outflow valve of claim 1, wherein the outer housing is at least partially formed from fiber reinforced PolyEtherlmide (PEI).

10. The outflow valve of claim 1, wherein the outer housing is at least partially formed from fiber reinforced Polyetheretherketone (PEEK).

11. An outflow valve for managing a desired pressure differential, comprising:
a cylindrical valve housing, comprising:
an inner sleeve defining a flow passage through the cylindrical valve housing having first and second apertures therethrough; and
an outer housing having an inner surface defining a bell-shaped inlet to a flow passage through the cylindrical valve housing extending beyond at least one end of the flow passage defined by said inner sleeve;
the outer housing having enveloping dimensions for reinforcing the inner sleeve;
the outer housing and the inner sleeve being in non-fused contact with each other;
both the outer housing and inner sleeve being independently capable of withstanding the pressure differential so that the outer housing and inner sleeve provide redundancy;
an angled drive shaft having first and second ends rotatably coupled to the cylindrical valve housing;
a butterfly plate dimensioned to fit within the cylindrical valve housing, the butterfly plate being fixedly coupled to the angled drive shaft and configured to rotate with the angled drive shaft between a closed position and an open position
a first drive shaft reinforcing sleeve mounted around the first end of the angled drive shaft and extending through the first aperture and into the flow passage; and
a second drive shaft reinforcing sleeve disposed around the second end of the angled drive shaft, the second drive shaft reinforcing sleeve protruding into the flow passage and abutting a peripheral portion of the butterfly plate in the open position.

12. The outflow valve of claim 11, further comprising a closing spring coupled to the angled drive shaft, the closing spring being configured to urge the butterfly plate toward the closed position.

13. The outflow valve of claim 11, further comprising an end-of-travel stop coupled to the angled drive shaft, the end-of-travel stop being configured to limit rotation of the butterfly plate.

14. The outflow valve of claim 11, wherein the outer housing includes first and second housing bosses molded into the outer housing, the first and second housing bosses configured to couple with first and second drive shaft reinforcing.

15. The outflow valve of claim 14, wherein the first drive shaft reinforcing sleeve extends into the cylindrical valve housing and couples with the butterfly plate.

16. The outflow valve of claim 14, wherein the second drive shaft reinforcing sleeve extends into the cylindrical valve housing and is configured to limit rotation of the butterfly plate.

17. An outflow valve, comprising:
a valve housing comprising:
an inner wall having a machined inner surface forming a central bore extending therethrough;
an outer wall about said inner wall providing redundancy to said valve housing; and
the outer wall having a bell-shaped inlet extending beyond the bore of the inner wall for accelerating air flowing through the valve;
a butterfly plate disposed in the central bore and movable between an open position and a closed position;
the butterfly plate having an aerodynamic shape that accelerates air flowing through the valve;
a drive shaft coupled to the butterfly plate and rotatably mounted in the valve housing, and the drive shaft angled with respect to a major face of the butterfly plate; and
a drive shaft reinforcing sleeve disposed around a portion of the drive shaft and extending into the central bore to form a protrusion that is spaced from the butterfly plate in the closed position and that abuts the butterfly plate in the open position to limit the movement thereof.

* * * * *